Dec. 29, 1925.
R. F. MAU
1,567,745
LUBRICATING DEVICE
Filed Nov. 3, 1921 3 Sheets-Sheet 3
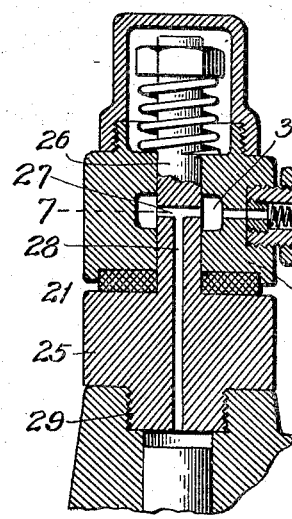
Fig. 6.
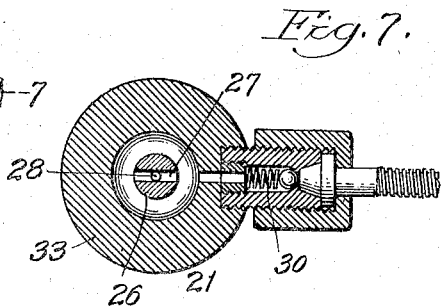
Fig. 7.
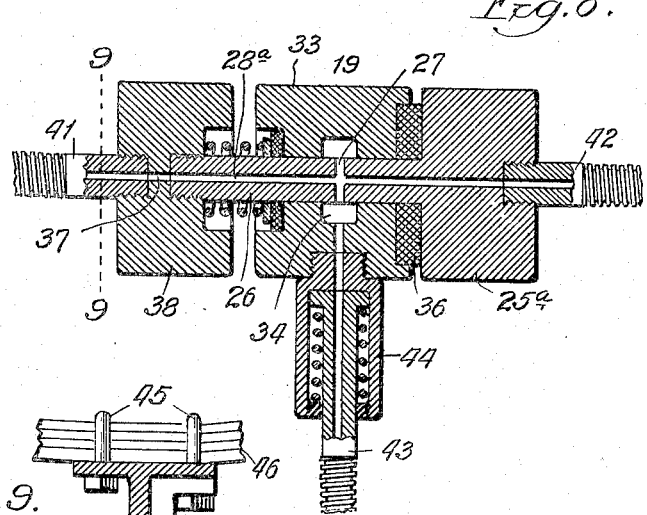
Fig. 8.
Fig. 9.
Witness:
John Enders
Inventor:
R. F. Mau,
by Wallace R. Lane
Atty.

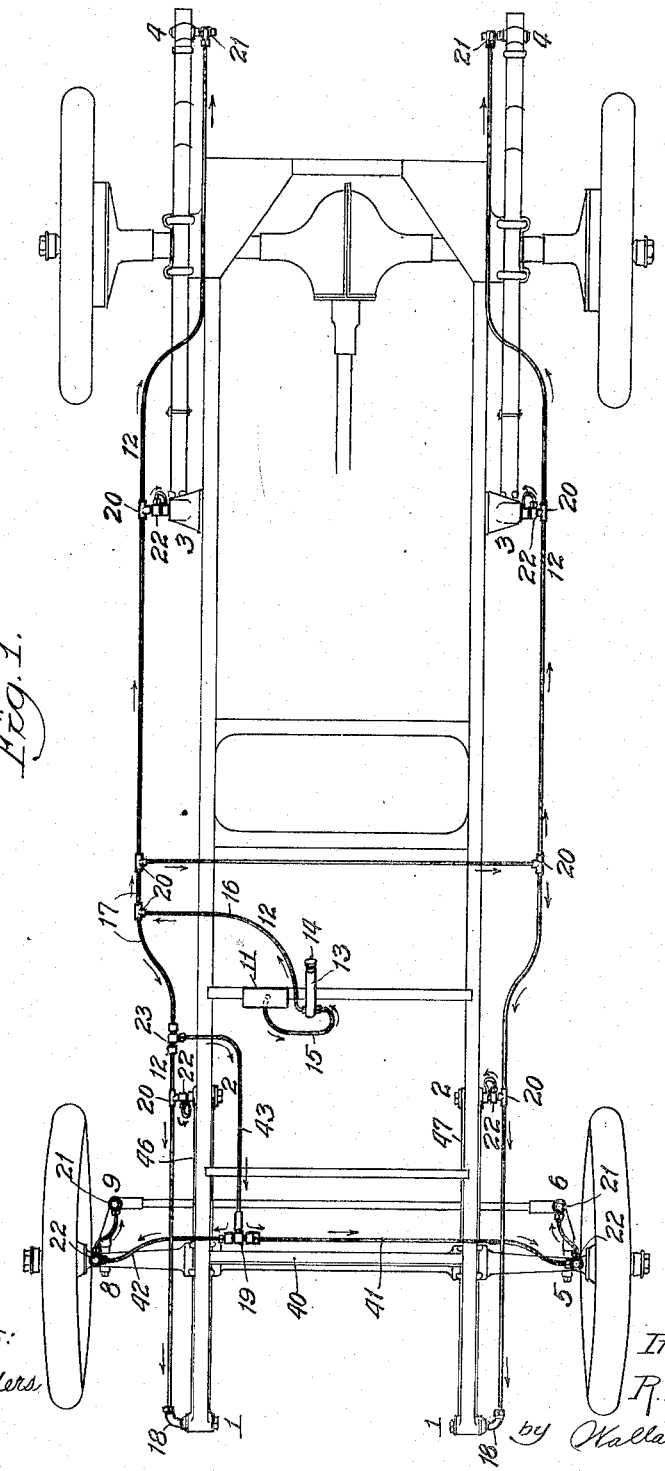

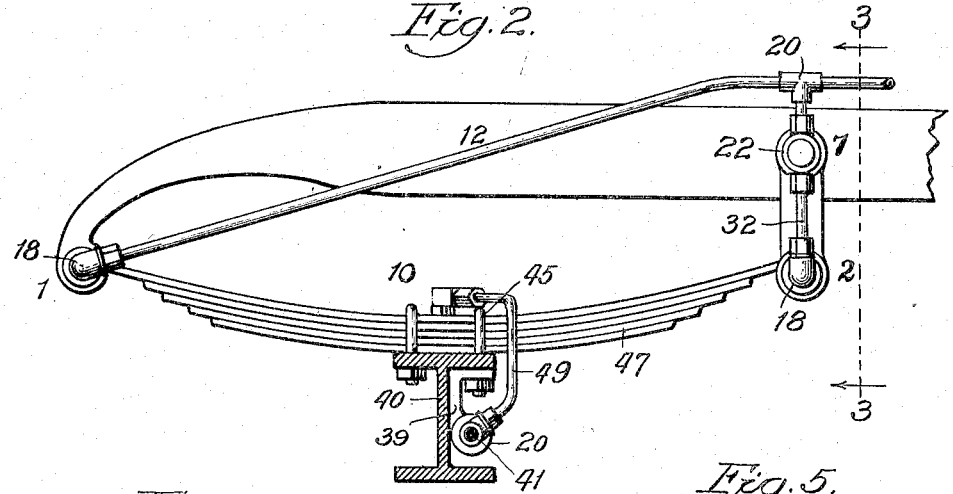
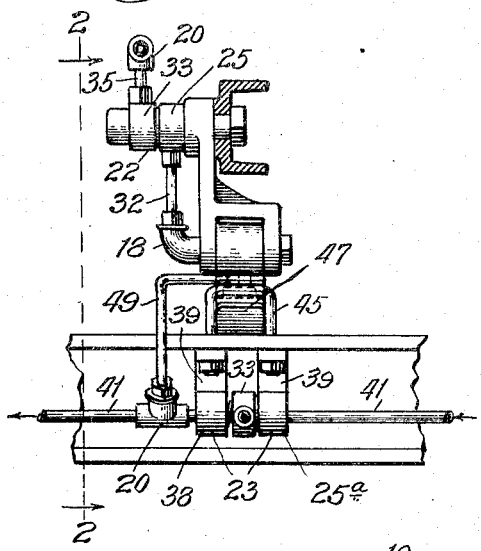
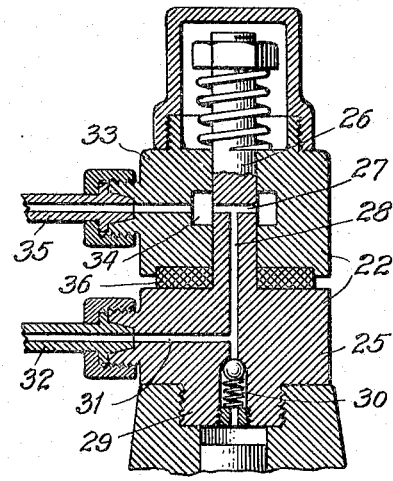
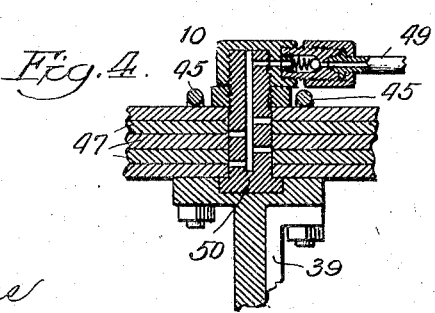

Patented Dec. 29, 1925.

1,567,745

UNITED STATES PATENT OFFICE.

RUDOLPH F. MAU, OF CHICAGO, ILLINOIS, ASSIGNOR TO MAU MANUFACTURING COMPANY, A CORPORATION OF ILLINOIS.

LUBRICATING DEVICE.

Application filed November 3, 1921. Serial No. 512,506.

*To all whom it may concern:*

Be it known that I, RUDOLPH F. MAU, a citizen of the United States, residing at Chicago, in the county of Cook and State of Illinois, have invented certain new and useful Improvements in Lubricating Devices, of which the following is a specification.

The present invention is designed primarily to make more easy and effective the manual lubrication of vehicles, such as motor vehicles, and among the objects of my invention are to provide a new and improved lubricating system for the movable joints of a vehicle, such as the steering knuckles, the hubs, the spring joints, etc., of an automobile; to provide improved means for connecting the parts of such a lubricating system; to provide a yieldable connection adapted to carry the lubricating medium in such a system and to permit the various relative movements of the parts without straining thereof; and such further objects, advantages and capabilities as will later more fully appear.

My invention further resides in the combination, construction and arrangement of parts illustrated in the accompanying drawings, and while I have shown therein a preferred embodiment I desire the same to be understood as illustrative only and not as limiting my invention.

In the accompanying drawings:—

Fig. 1 is a diagrammatic plan of the running gear of a motor vehicle with my lubricating system applied thereto, the system being superposed above the frame and running gear for the sake of clearness of illustration.

Fig. 2 is a broken sectional elevation of the forward end of the running gear on line 2—2 of Fig. 3.

Fig. 3 is a broken sectional elevation substantially along the plane indicated by the line 3—3, Fig. 2.

Fig. 4 is a broken section through the forward axle and spring.

Fig. 5 is a longitudinal section through one form of connecting means used in this system.

Fig. 6 is a longitudinal section through another form of connection means used in this system.

Fig. 7 is a transverse section substantially along the plane indicated by the line 7—7 Fig. 6.

Fig. 8 is a longitudinal section of another form of connector used in this system.

Fig. 9 is a partial sectional elevation substantially along the plane indicated by the line 9—9 Fig. 8, designed to show the attachment of the lubricating system to the frame of the machine.

Referring more in detail to the annexed drawings numerals 1, 2, 3, 4, designate the various bearings or joints at the ends of the springs while numerals 5, 6, 7, 8, 9 and 10 designate various other joints which are to be supplied with a lubricating medium. My new lubricating system comprises a tank 11 adapted to contain the lubricating fluid and a piping system 12 connecting this tank with the various movable joints of the machine. Within the piping 12 is a pump 13 having a handle 14 by means of which the pump piston may be actuated to force the lubricant throughout the piping system to the joints. It is believed that the method of lubrication will be clear from the drawings without a detailed description thereof, it being obvious that when the pump is operated the oil will pass outwardly therefrom, forwardly, rearwardly, and transversely of the machine to the various joints as indicated. However, an important feature of this invention resides in the fact that a single pipe 15 leads from the tank 11 to the pump 13 and a single pipe 16 leads from the pump to the distributing pipes 17.

Within the piping system there are several kinds of connections designated respectively by the numerals 18, 19, 20, 21, 22 and 23. Of these, numerals 18 and 20 designate simple L and T connectors, while the connector designated 19 is shown in detail in Fig. 8, that designated 21 is shown in Fig. 6 and that designated 22 is shown in Fig. 5. The connector designated 23 is like that shown in Fig. 8 except that there is not provided a spring takeup means as here shown. The connectors shown in Figs. 5 and 6 are essentially the same except that the former is a three way connector and the latter a two way connector, but these differences will be discussed in detail hereinafter.

Attention is called to the fact that a spring check-valve associated with each terminal connector permits the lubricant to pass through when sufficient pressure is applied thereto but prevents its return upon removal of the pressure caused by the pump 13. This also prevents dirt from working back through the piping system into the pump and oil tank. Accordingly all connectors numbered 18 and 21 in Fig. 1 are provided with check-valves, while connectors 22 have normally one exit controlled by a check-valve.

Reference will now be had more particularly to the structure shown in Fig. 5, in which numeral 25 designates the body portion of the connector which is provided with a substantially axially located projection or spindle 26 which has a transverse aperture 27 extending therethrough. An aperture 28 extends from aperture 27 longitudinally of the spindle and body member 25 and opens through a threaded connection 29, within which is located a check-valve 30, comprising a ball, a spring, and means for holding these within an enlargement of the channel 28. In this instance it is shown as an externally screw-threaded flat ring whose threads co-operate with threads cut in the extension 29 of body member 25. It is obvious that this check valve 30 will prevent any lubricant from flowing through the connector unless sufficient pressure is exerted to overcome the spring tension of this check valve. Since all the check valves are accurately set to open at the same pressure, preferably about three pounds, there will be no flow of oil unless the pump 13 is actuated. Extending from aperture 28 laterally through the body member 25 is an aperture 31, to which is connected a pipe line 32 to carry lubricant to another joint or joints, as shown in Figs. 2 and 3. Rotatably journalled on the spindle 26 is a member 33 having its interior hollowed out as at 34 to form a small receptacle for lubricating material so that the same may reach transverse aperture 27 in whatever position of adjustment members 25 and 33 may be. Leading laterally through the wall of member 33 is an aperture, in communication with which is a pipe line 35 by means of which lubricant is sent to the connector. It will be seen from the various figures that there is a packing material 36 between the body member 25 and the pivoted member 33 to produce a tight joint and reduce friction at this point. Also that these parts are held tightly assembled by means of a spring and nut mounted on the end of spindle 26. Between this spring and member 33 and surrounding the spindle a washer and packing material may be placed to prevent escape of oil and reduce friction as stated above.

The above describes the connector when the same is used both as a terminal and as a lead to supply lubricant to some other joints. The construction shown in Fig. 6 is similar to that of Fig. 5 except that this is a terminal and does not have connection for feeding lubricant to another joint. In this case the check valve is inserted at the end of the pipe leading to the connector rather than at the extremity thereof, but may equally as well be inserted in the same location as that in Fig. 5. However, the two check valves operate in the same manner.

The construction shown in Fig. 8, unlike that shown in Fig. 5 is not provided with any check valve 30, but the body member 25$^a$ is apertured longitudinally as in the preceding example and the spindle 26 has the longitudinal aperture 28$^a$ extending entirely therethrough and communicating with an aperture 37 extending longitudinally through member 38 which has formed upon one side thereof a bracket 39, by means of which this member is secured to an axle 40, whether this be an I-beam as shown in Fig. 2 or T shape as shown in Fig. 9. Leading from opposite ends of this connector are pipes 41 and 42 which convey the lubricant to other joints, as described above, in order to lubricate the same. It will be seen from the foregoing that, since members 25$^a$ and 38 are both provided with brackets 39 by means of which they are rigidly secured to an axle or frame member, there will be no relative rotation between these members, but member 33, as in the preceding cases, is rotatably mounted on the spindle 26. In this instance member 38 co-operates with the spring surrounding the spindle 26 to hold member 33 tightly seated against the gasket 36. Yieldingly connecting the feed pipe 43 with pivoted member 33 is a spring takeup mechanism 44 which permits longitudinal contraction and expansion of the pipe line, caused by forward and backward movement of the axle to which connector 19 is secured. It should perhaps be noted in this connection that one of the U-bolts 45, which holds the spring 46 to the axle 40 has its ends extending through the brackets 39 in order to secure the same in place.

It is of course understood that Fig. 1 is quite diagrammatic and that the various feed pipes will, whenever possible, be placed inside of or beneath the side members of the frame or against other running gear parts as, for example, against the rear face of the front axle. Thus it will be seen that pipe 41 passes along the axle 40 beneath the spring 47 at the left side of the machine. Here it is provided with a connector 20, having brackets 39 so that it may be held in place by the U-bolt as heretofore described. The pipe 49 leads from this pipe 41 (see Figs. 2 and 3) to the bolt 50 which is normally passed through the spring leaves to hold them together. This bolt is bored longitudinally and provided with a plurality of laterally directed vents arranged in staggered relation to lead the lubricant out between the leaves of the spring. This being a terminal connector, a check valve is provided in order to prevent the lubricant from being fed to the spring until a sufficient pressure has been developed to force the check valve open. However, in this instance the check valve is preferably placed at the junction of the connector or cap nut and the pipe leading to the bolt. It will be obvious that a similar arrangement is provided for each of the other springs so that they may all be lubricated.

Among the numerous advantages of the present invention are the following: The single feed line from the tank through the pump to the distributing pipes results in a uniform pressure throughout the system, causing all bearings to be fed with lubricant under the same pressure and assuring lubrication of every movable joint, not allowing any one of these to go without oil while the others are properly lubricated. There is a further advantage that, with a lubricating system of this type, provided with my new connectors, the parts of the vehicle may function normally without any danger of bending or straining the feed lines, as has resulted from some prior attempts to lubricate the movable joints of a vehicle, mechanically. The present lubricating system is so constructed and applied that there is no bending or tensile strain placed upon the parts thereof other than what may be accommodated by rotary members 33 and spring takeup 44.

It is of course understood that the specific description of structure set forth above may be departed from without departing from the spirit of my invention as set forth in this specification and the appended claims.

Having now described my invention, I claim:—

1. In a lubricating system, a connection comprising a body member having securing means at one end thereof and provided with a longitudinally extending aperture, a longitudinally extending stem projecting from the opposite end thereof and provided with a transverse aperture connected with the said longitudinal aperture, and a hollow member pivoted on said stem and provided with means for connecting thereto a pipe for the flow of lubricant.

2. In a lubricating system, a connection comprising a body member provided with a longitudinally extending aperture, a longitudinally extending stem provided with a transverse aperture connected with the said longitudinal aperture, and a hollow member pivoted on said stem and having an aperture extending outwardly from the hollow interior of said hollow member to afford a means for the flow of lubricant, and resilient means connected with said stem to hold the said hollow member tightly against the body member.

3. In a connector, a body member and a stem member, said stem member having a transverse aperture and a longitudinal aperture extending from said transverse aperture down through said stem and body member, a member pivotally mounted on said stem and having a hollow interior in registry with the said transverse aperture, said pivoted member being provided on one face with means whereby it may be connected to a pipe and having an aperture extending from its interior through said last named stem.

4. In a device of the class described a lubricant reservoir, a system of lubricant carrying pipes, a series of joints to be lubricated adapted to relieve strain on said pipes, a connection on said pipes having a body member and a stem member, transverse and longitudinal apertures in said body and stem members and a hollow member pivoted to said stem member containing a transverse aperture to hold a lubricant carrying pipe.

5. In a device of the class described a lubricant reservoir, a system of lubricant carrying pipes, a connection between said reservoir and said pipes, a series of joints to be lubricated, means to allow movement of said joints to prevent strain on said pipes, a connection on said pipes having a body member and a stem member, transverse and longitudinal apertures in said body and stem members and a hollow member pivoted to said stem member containing a transverse aperture to hold a lubricant carrying pipe.

In witness whereof, I hereunto subscribe my name to this specification.

RUDOLPH F. MAU.